US011537957B2

(12) United States Patent
Padullaparthi et al.

(10) Patent No.: US 11,537,957 B2
(45) Date of Patent: Dec. 27, 2022

(54) ESTIMATING CAPACITY AND USAGE PATTERN OF BEHIND-THE-METER ENERGY STORAGE IN ELECTRIC NETWORKS

(71) Applicant: Tata Consultancy Services Limited, Mumbai (IN)

(72) Inventors: Venkata Ramakrishna Padullaparthi, Hyderabad (IN); Venkatesh Sarangan, Chennai (IN); Anand Sivasubramaniam, Chennai (IN); Anindya Pradhan, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 311 days.

(21) Appl. No.: 16/793,206

(22) Filed: Feb. 18, 2020

(65) Prior Publication Data

US 2020/0265350 A1   Aug. 20, 2020

(30) Foreign Application Priority Data

Feb. 16, 2019   (IN) .............................. 201921006191

(51) Int. Cl.
*G06Q 10/04* (2012.01)
*H02J 3/14* (2006.01)
*G06Q 50/06* (2012.01)

(52) U.S. Cl.
CPC ............. *G06Q 10/04* (2013.01); *G06Q 50/06* (2013.01); *H02J 3/14* (2013.01)

(58) Field of Classification Search
CPC ................... G06Q 10/04; G06Q 50/06

(Continued)

(56) References Cited

U.S. PATENT DOCUMENTS 10,719,636 B1 *   7/2020   Hoff ....................... G06Q 50/06
2010/0179704 A1 *  7/2010   Ozog ................. G06Q 30/0283
                                                                 703/2

(Continued)

FOREIGN PATENT DOCUMENTS

| CN | 104269849 | 1/2015 |
| JP | 5877479 | 2/2016 |
| JP | 2016059135 | 4/2016 |

OTHER PUBLICATIONS

Ru, Y. et al. (Jan. 2013). "Storage Size Determination for Grid-Connected Photovoltaic Systems," *IEEE Transactions on Sustainable Energy*, vol. 4, No. 1; pp. 1-14.

*Primary Examiner* — Ricky Go
(74) *Attorney, Agent, or Firm* — Finnegan, Henderson, Farabow, Garrett & Dunner LLP

(57) ABSTRACT

The present disclosure provides a method and a system for estimating capacity and usage pattern of behind-the-meter energy storage in electric networks. Conventional techniques on estimating an effective capacity of behind-the-meter energy storage of a consumer, in presence of distributed energy generation units is limited, computationally intensive and provide inaccurate prediction. The present disclosure provides an accurate estimate of the effective capacity and usage pattern of behind-the-meter energy storage of a target consumer utilizing data samples received from a utility in presence of one or more distributed energy generation units, using an energy balance equation with less computation and accurate prediction. Based on accurate estimation of the effective capacity and usage pattern, the utility may plan for proper infrastructure to meet power demands of the consumers.

11 Claims, 9 Drawing Sheets

(58) Field of Classification Search
USPC .......................................................... 702/57
See application file for complete search history.

(56) References Cited

U.S. PATENT DOCUMENTS

| | | | |
|---|---|---|---|
| 2012/0005126 A1 | 1/2012 | Oh et al. | |
| 2012/0259474 A1* | 10/2012 | Razum | G06Q 50/06 700/291 |
| 2016/0036247 A1* | 2/2016 | Park | G06Q 30/04 307/66 |
| 2016/0233682 A1* | 8/2016 | Do Rosario | G06Q 10/06315 |

* cited by examiner

ESTIMATING CAPACITY AND USAGE PATTERN OF BEHIND-THE-METER ENERGY STORAGE IN ELECTRIC NETWORKS

PRIORITY CLAIM

This U.S. patent application claims priority under 35 U.S.C. § 119 to: Indian Patent Application No. 201921006191, filed on 16 Feb. 2019. The entire contents of the aforementioned application are incorporated herein by reference.

TECHNICAL FIELD

The disclosure herein generally relates to power management methods, and particularly to a method and a system for estimating capacity and usage pattern of behind-the-meter energy storage in electric networks.

BACKGROUND

In present electric networks, rapid growth of using energy storage such as a battery, in presence of distributed energy generation units, especially renewable energy sources including small hydro, solar power, wind power, biogas and so on, poses operational challenges to utilities owing to increased variabilities in generation and presence of two-way power flows. An effective capacity of the energy storage is normally less than that of a rated capacity. At large penetration levels, inaccurate prediction of energy storage capacity and distributed energy generation impacts quality of demand forecasts and ability to provision for adequate supply at appropriate time. This may lead to operational issues such as voltage fluctuations beyond acceptable limits, increased system losses and mal-functioning of voltage-regulation and protection devices.

The utilities have to determine a quantity and quality of the energy storage along with the distributed energy generation units to accurately predict the capacity of the energy storage and the generation from such distributed energy generation units. Unlike the largescale energy storage and the distributed energy generation units which are rigorously metered, the small-scale energy storage and the distributed energy generation units are mostly behind-the-meter, and are not monitored by the utilities. Presence of behind-the-meter energy storage and the distributed energy generation units complicates ability of the utilities to estimate the quantity of the energy storage and the distributed energy generation units available within their consumer pool.

Utilities may have a manifested demand ($E_{man}$) of a consumer, which is the net of an original demand ($E_{raw}$) of a building adjusted for the distributed energy generation units and power flow to/from the energy storage. But the utility has to know an estimated behind-the-meter energy storage capacity in presence of the distributed energy generation units owned by the consumer to provide adequate supply with appropriate infrastructure planning and operations. The estimates may also help the utility to offer appropriate tariff plans and services for the consumer.

SUMMARY

Embodiments of the present disclosure present technological improvements as solutions to one or more of the above-mentioned technical problems recognized by the inventors in conventional systems.

In an aspect, there is provided a processor implemented method for estimating effective capacity and usage pattern of behind-the-meter energy storage of a target consumer in presence of one or more distributed energy generation units, the method comprising the steps of: receiving data samples, at every pre-defined time instant t for a predefined time period T, by one or more hardware processors, from a utility, wherein the data samples contain a manifested demand $E_{man}(t)$ of the target consumer, an exported energy $E_{FIT}(t)$ by the target consumer back to the utility and an energy source factor S(t) corresponding to each of the one or more distributed energy generation units; determining yield $Y_u(t)$ of the one or more distributed energy generation units, by the one or more hardware processors, based on a corresponding energy source factor S(t) of the one or more distributed energy generation units, at every pre-defined time instant t; determining total yield yield (t) of the one or more distributed energy generation units, by the one or more hardware processors, based on a corresponding estimated effective capacity P of the one or more distributed energy generation units of the target consumer and a corresponding yield $Y_u(t)$ of the one or more distributed energy generation units, at every pre-defined time instant t; estimating original energy demand values $E_{raw}(t)$ of the target consumer, by the one or more hardware processors, based on an original energy demand $E_{raw}(t)$ of a known reference consumer, at every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer and the reference consumer from the utility; determining estimated charging or discharging values $B_{chdch}(t)$ of the behind-the-meter energy storage, at every pre-defined time instant t, by the one or more hardware processors, based on the estimated original energy demand values $E_{raw}(t)$ of the target consumer; computing a median of the estimated charging or discharging values $B_{chdch}(t)$, by the one or more hardware processors, for each pre-defined period l containing one or more pre-defined time instances t, in the pre-defined time period T; estimating the usage pattern as a charging and discharging schedule of the behind-the-meter energy storage, by segregating charging periods and discharging periods, based on the median of estimated charging or discharging values $B_{chdch}(l)$ of the energy storage for the predefined time period T, by the one or more hardware processors; and estimating the effective capacity $\overline{B_{eff}}$ of behind-the-meter energy storage of the target consumer, by the one or more hardware processors, based on the estimated charging or discharging values $B_{chdch}(t)$, wherein the effective capacity of behind-the-meter energy storage of the target consumer is an absolute maximum value obtained from cumulative estimated charging or discharging values $B_{chdch}(t)$.

In another aspect, there is provided a system for estimating effective capacity and usage pattern of behind-the-meter energy storage of a target consumer in presence of distributed energy generation units, the system comprising: one or more data storage devices operatively coupled to one or more hardware processors and configured to store instructions which when executed cause the one or more hardware processors to: receive data samples, at every pre-defined time instant t for a predefined time period T, from a utility, wherein the data samples contain a manifested demand $E_{man}(t)$ of the target consumer, an exported energy $E_{FIT}(t)$ by the target consumer back to the utility and an energy source factor S(t) corresponding to each of the one or more distributed energy generation units; determine yield $Y_u(t)$ of the one or more distributed energy generation units, based on a corresponding energy source factor $S(t)$ of the one or more distributed energy generation units, at every pre-defined time instant t, determine total yield yield (t) of the one or more distributed energy generation units, based on a corresponding estimated effective capacity P of the one or more distributed energy generation units of the target consumer and a corresponding yield $Y_u(t)$ of the one or more distributed energy generation units, at every pre-defined time instant t; estimate original energy demand values $E_{raw}(t)$ of the target consumer, based on an original energy demand $E_{raw}$ (t) of a known reference consumer, at every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer from the utility; determine estimated charging or discharging values $B_{chdch}$ (t) of the behind-the-meter energy storage, at every pre-defined time instant t, based on the estimated original energy demand values $E_{raw}$ (t) of the target consumer; compute a median of the estimated charging or discharging values $B_{chdch}(l)$, for each pre-defined period l containing one or more pre-defined time instances t, in the predefined time period T; estimate the usage pattern as a charging and discharging schedule of the behind-the-meter energy storage, by segregating charging periods and discharging periods, based on the median of estimated charging or discharging values $B_{chdch}(l)$ of the energy storage for the predefined time period T; and estimate the effective capacity $\overline{B_{eff}}$ of behind-the-meter energy storage of the target consumer, based on the estimated charging or discharging values $B_{chdch}(t)$, wherein the effective capacity $\overline{B_{eff}}$ of behind-the-meter energy storage of the target consumer is an absolute maximum value obtained from cumulative estimated charging or discharging values $B_{chdch}(t)$.

In yet another aspect, there is provided a computer program product comprising a non-transitory computer readable medium having a computer readable program embodied therein, wherein the computer readable program, when executed on a computing device, causes the computing device to: receive data samples, at every pre-defined time instant t for a predefined time period T, from a utility, wherein the data samples contain a manifested demand $E_{man}(t)$ of the target consumer, an exported energy $E_{FIT}(t)$ by the target consumer back to the utility and an energy source factor $S(t)$ corresponding to each of the one or more distributed energy generation units; determine yield $Y_u(t)$ of the one or more distributed energy generation units, based on a corresponding energy source factor $S(t)$ of the one or more distributed energy generation units, at every pre-defined time instant t, determine total yield yield (t) of the one or more distributed energy generation units, based on a corresponding estimated effective capacity P of the one or more distributed energy generation units of the target consumer and a corresponding yield $Y_u(t)$ of the one or more distributed energy generation units, at every pre-defined time instant t estimate original energy demand values $E_{raw}(t)$ of the target consumer, based on an original energy demand $E_{raw}(t)$ of a known reference consumer, at every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer from the utility; determine estimated charging or discharging values $B_{chdch}$ (t) of the behind-the-meter energy storage, at every pre-defined time instant t, based on the estimated original energy demand values $E_{raw}(t)$ of the target consumer; compute a median of the estimated charging or discharging values $B_{chdch}(l)$, for each pre-defined period l containing one or more pre-defined time instances t, in the predefined time period T; estimate the usage pattern as a charging and discharging schedule of the behind-the-meter energy storage, by segregating charging periods and discharging periods, based on the median of estimated charging or discharging values $B_{chdch}(l)$ of the energy storage for the predefined time period T; and estimate the effective capacity $\overline{B_{eff}}$ $\overline{B_{eff}}$ of behind-the-meter energy storage of the target consumer, based on the estimated charging or discharging values $B_{chdch}(t)$, wherein the effective capacity $\overline{B_{eff}}$ of behind-the-meter energy storage of the target consumer is an absolute maximum value obtained from cumulative estimated charging or discharging values $B_{chdch}(t)$.

In an embodiment of the present disclosure, the yield $Y_u(t)$ of the one or more distributed energy generation units are determined according to a relation: $Y_u(t)=f(S(t))$, where f represents an energy conversion function.

In an embodiment of the present disclosure, the estimated effective capacity P of each of the one or more distributed energy generation units of the target consumer is determined as a maximum value of a ratio of a corresponding exported energy $E_{FIT}(t)$ by the target consumer to the corresponding yield $Y_u(t)$ of the one or more distributed energy generation units.

In an embodiment of the present disclosure, the estimated effective capacity P of each of the one or more distributed energy generation units of the target consumer is determined according to a relation: $P=\max (E_{FIT}(t)/Y_u(t))$.

In an embodiment of the present disclosure, the total yield yield (t) of each of the one or more distributed energy generation units is determined according to a relation: $yield(t)=P*Y_u(t)$.

In an embodiment of the present disclosure, the estimated charging or discharging values $B_{chdch}(t)$ of the behind-the-meter energy storage are determined according to a relation: $B_{chdch}(t)=E_{raw}(t)-yield(t)-E_{man}(t)+E_{FIT}(t)$.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
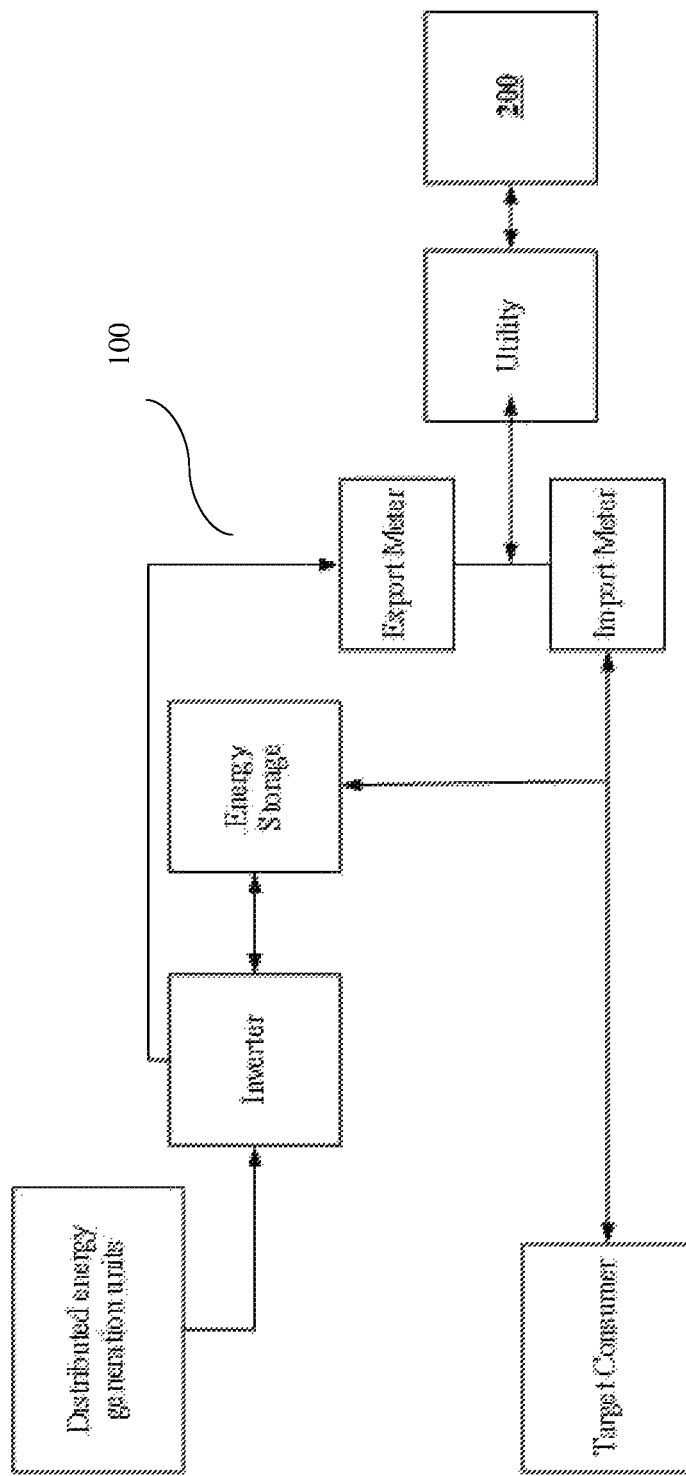
FIG. 1A is a block diagram showing an exemplary arrangement for estimating effective capacity and usage pattern of behind-the-meter energy storage of a target consumer having a FIT meter, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Conventional techniques of estimating an effective capacity of behind-the-meter energy storage of a consumer, in presence of distributed energy generation units is limited, computationally intensive and provides inaccurate prediction. In accordance with the present disclosure, the effective capacity and usage pattern of behind-the-meter energy storage of a target consumer are accurately estimated in presence of one or more distributed energy generation units, using an energy balance equation with less computation and accurate prediction.

Referring now to the drawings, and more particularly to FIG. 1A through FIG. 6, where similar reference characters denote corresponding features consistently throughout the figures, there are shown preferred embodiments and these embodiments are described in the context of the following exemplary methods and systems for estimating the effective capacity and the usage pattern of the behind-the-meter energy storage of the target consumer in presence of the one or more distributed energy generation units.

FIG. 1A is a block diagram showing an exemplary arrangement (100) for estimating the effective capacity and the usage pattern of behind-the-meter energy storage of the target consumer having a FIT meter, in accordance with an embodiment of the present disclosure. The one or more distributed energy generation units may be present in the electric network for generating the power. In an embodiment, the one or more distributed energy generation units are renewable energy resources including solar power, wind power, biogas and small hydro, and non-renewable energy resources including fuel cells. An inverter may be connected to the one or more distributed energy generation units to convert the generated power from Direct Current (DC) form to Alternate Current (AC) form. The utility is connected to the electric network of the target consumer to supply the power required by consumer facilities. Multiple Feed-in-Tariff (FIT) meters are present for metering the power supplied by the utility to the target consumer and the power going back to the utility from the electric network of the consumer. In an embodiment, an import meter may be present for metering the power supplied by the utility to the consumer and an export meter may present for metering the power going back to the utility from the electric network of the consumer.

In an embodiment, the energy storage is connected to the one or more distributed energy generation units through the inverter for charging the power generated by the one or more distributed energy generation units. Also, the energy storage is connected to the utility through the import meter for charging the power supplied by the utility and connected to the utility through the inverter and the export meter for discharging the power back to the utility and back to the target consumer through the import meter. The consumer may be registered to multiple utilities to meet power demand required by the consumer facilities. The multiple utilities may be connected to an electric grid.

Figure 1B:
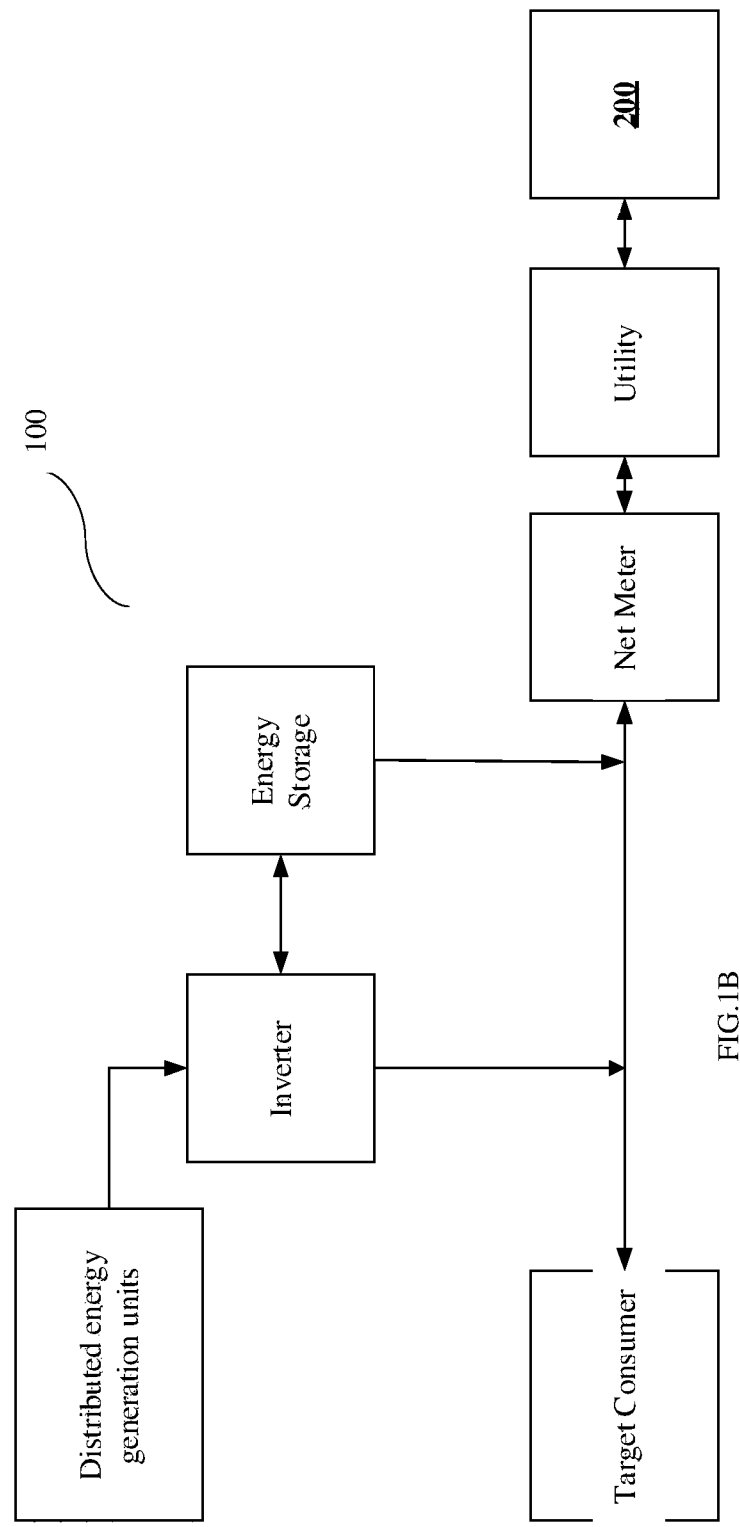
FIG. 1B is a block diagram showing an exemplary arrangement for estimating effective capacity and usage pattern of behind-the-meter energy storage of a target consumer having a NET meter, in accordance with an embodiment of the present disclosure.

FIG. 1B is a block diagram showing an exemplary arrangement for estimating the effective capacity and the usage pattern of behind-the-meter energy storage of the target consumer having a NET meter, in accordance with an embodiment of the present disclosure. The one or more distributed energy generation units may be present in the electric network for generating the power. In an embodiment, the one or more distributed energy generation units are renewable energy resources including solar power, wind power, biogas and small hydro, and non-renewable energy resources including fuel cells. The inverter may be connected to the one or more distributed energy generation units to convert the generated power from Direct Current (DC) form to Alternate Current (AC) form. The utility is connected to the electric network of the target consumer to supply the power required by consumer facilities. A NET meter is present for metering the power supplied by the utility to the target consumer and the power going back to the utility from the electric network of the target consumer.

In an embodiment, the energy storage is connected to the one or more distributed energy generation units through the inverter for charging the power generated by the one or more distributed energy generation units. Also, the energy storage is connected to the utility through the NET meter for charging the power supplied by the utility, connected to the utility through the inverter and the NET meter for discharging the power to the consumer facilities and back to the utility. The consumer may be registered to multiple utilities to meet power demand required by the consumer facilities. The multiple utilities may be connected to an electric grid.

Figure 2:
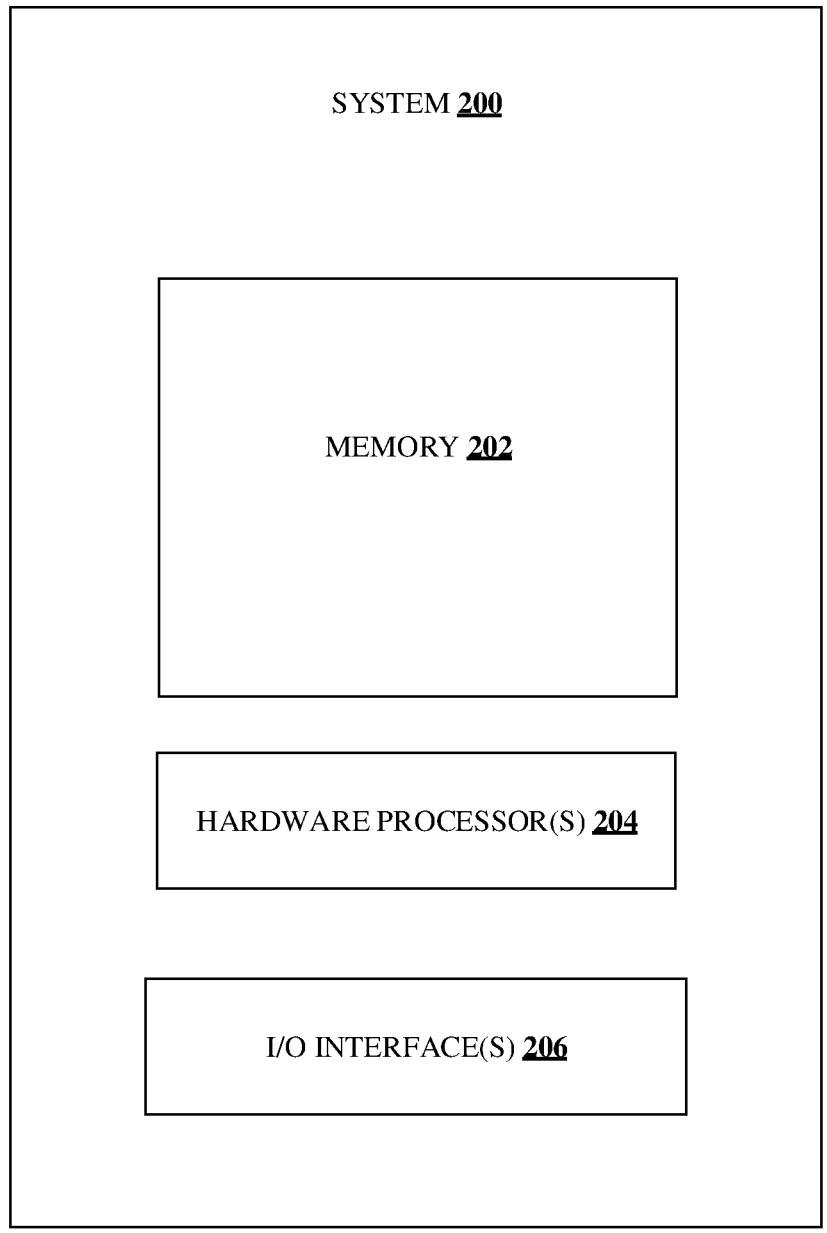
FIG. 2 illustrates a functional block diagram of a system for estimating effective capacity and usage pattern of behind-the-meter energy storage of a target consumer, in accordance with an embodiment of the present disclosure.

FIG. 2 illustrates a functional block diagram of a system 200 for estimating the effective capacity and the usage pattern of behind-the-meter energy storage of the target consumer, in accordance with an embodiment of the present disclosure. In an embodiment, the system 200 is connected to utility of FIG. 1 for estimating the effective capacity and the usage pattern of behind-the-meter energy storage of the target consumer. In an embodiment, the system 200 may be connected to one or more utilities which are connected to the grid for estimating the effective capacity and the usage pattern of behind-the-meter energy storage of the target consumer. In an embodiment, the system 200 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 3A:
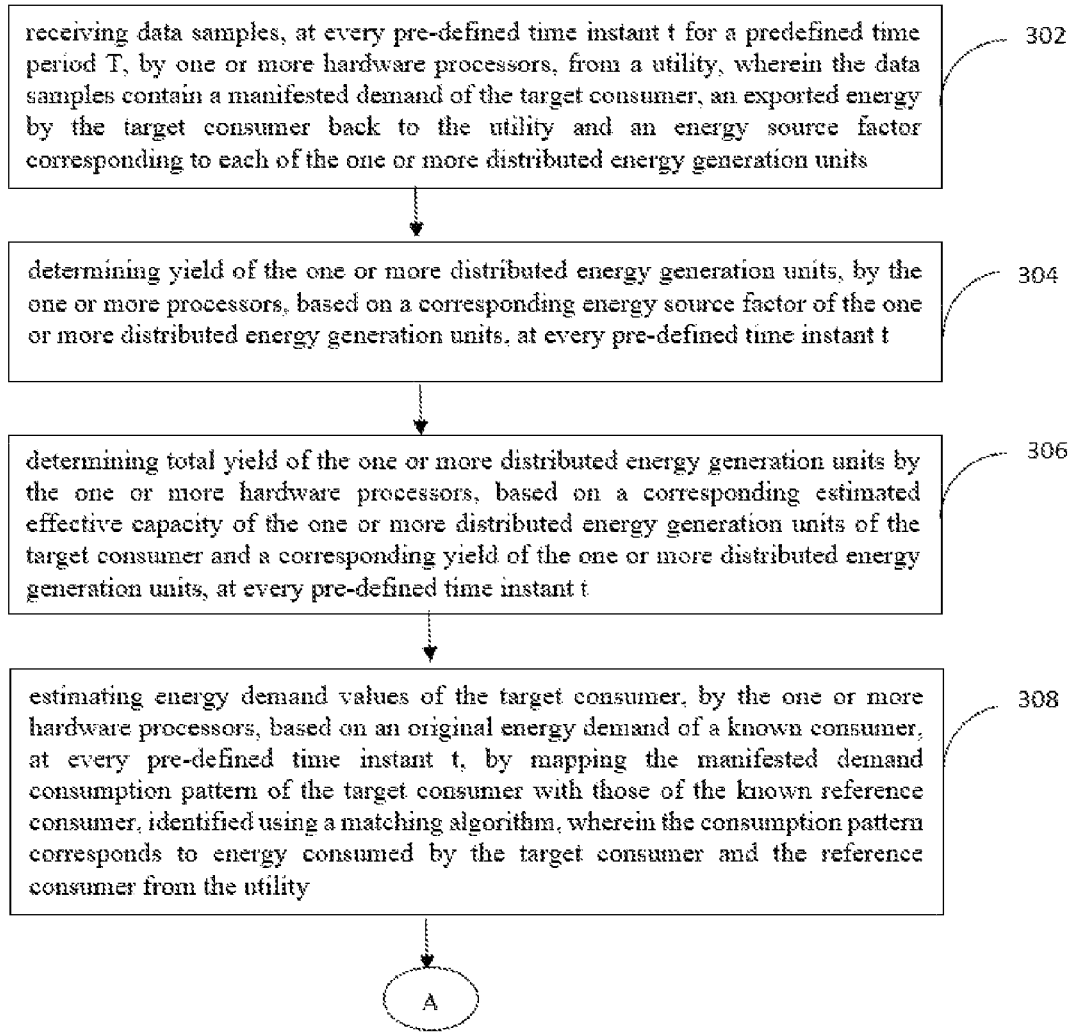
FIG. 3A through FIG. 3B illustrates a flow diagram of a method for estimating effective capacity and usage pattern of behind-the-meter energy storage of a target consumer, in accordance with an embodiment of the present disclosure.
Figure 3B:
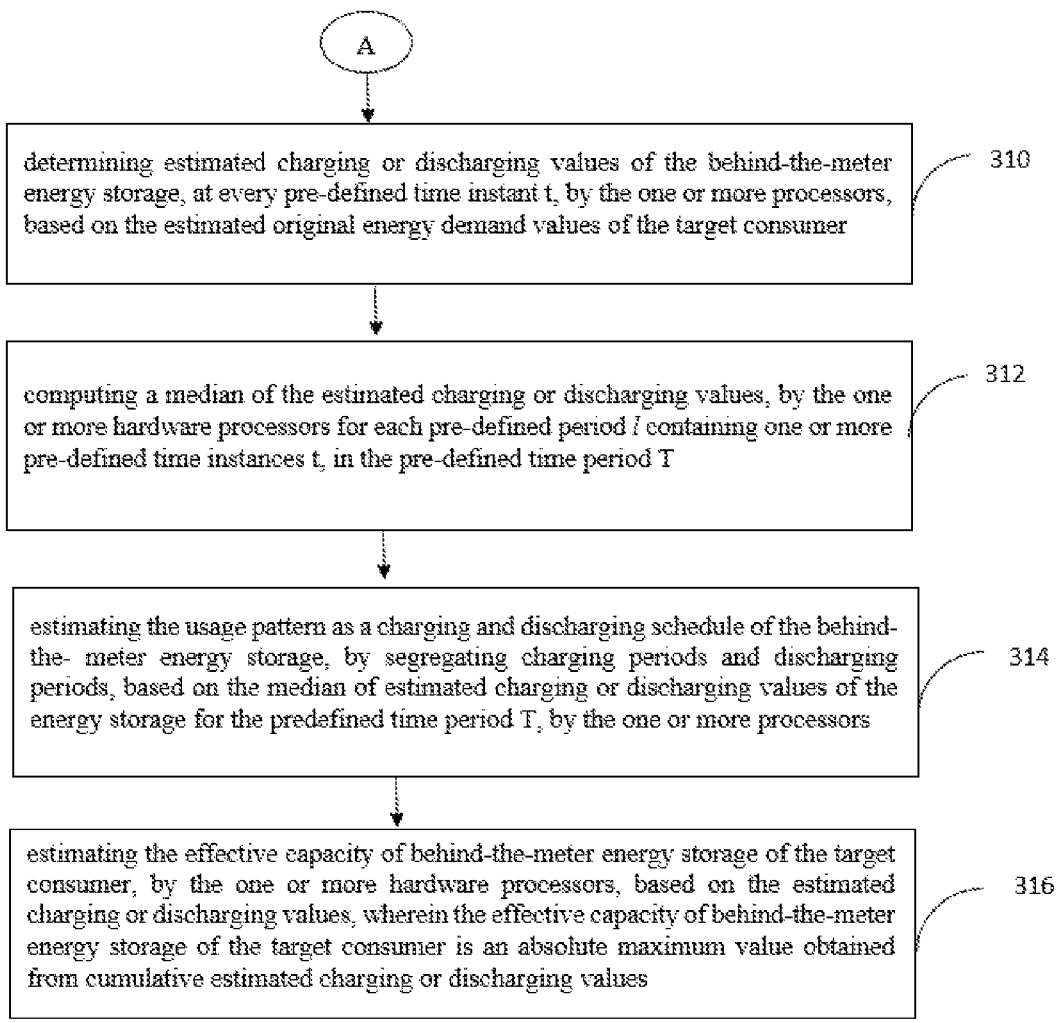

FIG. 3A through FIG. 3B illustrates a flow diagram of a method 300 for estimating the effective capacity and the usage pattern of behind-the-meter energy storage of the target consumer, in accordance with an embodiment of the present disclosure. In an embodiment, the one or more data storage devices or memory 202 operatively coupled to the one or more processors 204 is configured to store instructions configured for execution of steps of the method 300 by the one or more processors 204. The steps of the method 300 will now be explained in detail with reference to the exemplary arrangements 100 of FIG. 1A and FIG. 1B, and the components of the system 200 of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more hardware processors 204 are configured to receive data samples, at step 302, at every pre-defined time instant t for a predefined time period T, by one or more hardware processors, from the utility. The data samples contain a manifested demand $E_{man}(t)$ of the target consumer, an exported energy $E_{FIT}(t)$ by the target consumer back to the utility and an energy source factor S(t) corresponding to each of the one or more distributed energy generation units.

For a normal consumer without any energy storage and distributed energy generation units, utility typically uses smart meters for logging periodic consumption readings to generate the aggregated energy bill. A consumer (prosumer) with energy storage and the distributed energy generation units, may be interested to give the surplus energy generated back to the utility. Such prosumer may have either NET-metered (at retail energy price) or be paid for the excess energy at a different Feed-In-Tariff (FIT) price which is typically lower than the retail energy price. Net metering requires a bi-directional energy meter, while Feed-In-Tariff (FIT) mechanisms require two meters i.e., the import meter and the export meter.

The utility comprises periodically manifested demand $E_{man}(t)$ of the target consumer, at every pre-defined time instant t, that is fed by the utilities measured in kWh. The utility also comprises an exported energy $E_{FIT}(t)$, at every pre-defined time instant t, which is a surplus energy logged through the FIT meter (the export meter), by the target consumer back to the utility, measured in kWh. The utility also comprises the energy source factor S(t) of the one or more distributed energy generation units, at every pre-defined time instant t. In an embodiment, the energy source factor S(t) for the solar energy generation unit a raw solar irradiation value in kWh/m², commonly monitored for locations that fall under jurisdiction of the utility. Similarly, the energy source factor S(t) for the wind energy generation unit a wind speed value measured for the locations that fall under jurisdiction of the utility.

In an embodiment, the energy balance equation of the target consumer having the energy storage and the one or more distributed energy generation units, at every pre-defined time instant t is given by:

$$E_{man}(t) - E_{FIT}(t) = E_{raw}(t) - \text{yield}(t) - B_{chdch}(t) \quad (1)$$

where, $E_{raw}(t)$ is an original demand of the target consumer, yield (t) is a total yield of the one or more distributed energy generation units installed at the consumer site, $B_{chdch}(t)$ is net amount of energy charged or discharged by the energy storage, $E_{man}(t)$ is the manifested demand of the target consumer and $E_{FIT}(t)$ is the exported energy by the target consumer back to the utility.

In an embodiment, the one or more distributed energy generation units are renewable energy resources including solar power, wind power, biogas and small hydro, and non-renewable energy resources including fuel cells.

In an embodiment, the behind-the-meter energy storage is a battery installed at the target consumer, a back-up power source installed at the target consumer, a battery of an electric vehicle and a charging station.

In accordance with an embodiment of the present disclosure, the one or more hardware processors 204 are configured to determine, at step 304, a yield $Y_u(t)$ of the one or more distributed energy generation units, based on a corresponding energy source factor S(t) of the one or more distributed energy generation units, at every pre-defined time instant t.

In an embodiment, the yield $Y_u(t)$ of the one or more distributed energy generation units are determined according to a relation:

$$Y_u(t) = f(S(t)) \quad (2)$$

where f represents an energy conversion function which is a power curve that converts energy source factor S(t) of the one or more distributed energy generation units, into a corresponding yield $Y_u(t)$ of the one or more distributed energy generation units, at every pre-defined time instant t.

In accordance with an embodiment of the present disclosure, the one or more hardware processors 204 are configured to determine, at step 306, the total yield yield (t) of the one or more distributed energy generation units. The total yield yield (t) of the one or more distributed energy generation units is determined based on a corresponding estimated effective capacity $\hat{P}$ of the one or more distributed energy generation units of the target consumer and a corresponding yield ($Y_u(t)$) of the one or more distributed energy generation units, at every pre-defined time instant t.

The total yield yield (t) of the one or more distributed energy generation units is determined as per the below relation:

$$\text{yield}(t) = P * Y_u(t) \quad (3)$$

In an embodiment, the estimated effective capacity P of each of the one or more distributed energy generation units of the target consumer is determined as a maximum value of a ratio of a corresponding exported energy $E_{FIT}(t)$ by the target consumer to the corresponding yield $Y_u(t)$ of the one or more distributed energy generation units.

The estimated effective capacity P of each of the one or more distributed energy generation units of the target consumer is determined as per the below relation:

$$P = \max(E_{FIT}(t)/Y_u(t)) \quad (4)$$

Now, from the energy balance equation (1), $E_{raw}(t) - B_{chdch}(t)$ is determined based on the $E_{man}(t)$, the $E_{FIT}(t)$ and the yield (t) at every pre-defined time instant t. The revised balance equation can be written as:

$$E_{raw}(t) - B_{chdch} = E_{man}(t) E_{FIT}(t)) + \text{yield}(t) \quad (1a)$$

In accordance with an embodiment of the present disclosure, the one or more hardware processors 204 are configured to estimate, at step 308, original energy demand values $E_{raw}(t)$ of the target consumer, at every pre-defined time instant t. The original energy demand values $E_{raw}(t)$ of the target consumer are estimated based on the original energy demand $E_{raw}(t)$ of a known reference consumer, by mapping the manifested demand $E_{man}(t)$ consumption pattern of the target consumer with those of the known reference consumer, identified using a matching algorithm. The consumption pattern corresponds to the energy consumed by the target consumer and the reference consumer from the utility.

In an embodiment, the utility may have ground truth information about the energy storage, the distributed energy generation units and the original energy demand $E_{raw}(t)$ of some of the consumers of entire consumer base S in each consumption class $C_\in$. If some of the consumer group are referred as an acquaintance set $S_A$, then the ground truth information known for all the consumers $x_a \in S_A$. The hidden capacities of other consumer set $S_S = S - S_A$, is to be determined.

For the target consumer $x_s$, a matching reference consumer $x_{s,a}$ may be defined whose total energy consumption per day has statistical similarity. A probability density histogram of the target consumer $x_s$ daily consumption values $p(x_s)$ is obtained. Then a probability density histogram of the daily consumption values of each customer $x_a$ in the acquaintance set $S_A$ is obtained. The matching reference consumer $x_{s,a}$ whose histogram is close to $p(x_s)$ in terms of a Kullback Leibler (KL) distance is found by iterating through each $x_a \in S_A$.

The matching reference consumer $x_{s,a}$ is taken as the target consumer $x_s$ and may be formally represented as:

$$x_{s,a} = \min_{x_a, a \in S_A} KL(p(x_s), p(x_a)) \quad (5)$$

In accordance with an embodiment of the present disclosure, the one or more hardware processors 204 are configured to determine, at step 310, estimated charging or discharging values $B_{chdch}(t)$ of the behind-the-meter energy storage, at every pre-defined time instant t, based on the estimated original energy demand values $E_{raw}(t)$ of the target consumer.

The estimated charging or discharging values $B_{chdch}(t)$ of the behind-the-meter energy storage are determined as per the revised energy balance equation:

$$B_{chdch}(t) = E_{raw}(t) - E_{man}(t) + E_{FIT}(t)) - \text{yield}(t) \quad (1b)$$

In accordance with an embodiment of the present disclosure, the one or more hardware processors 204 are configured to compute, at step 312, a median of the estimated charging or discharging values $B_{chdch}(l)$, for each pre-defined period l containing one or more pre-defined time instances t, in the predefined time period T. In an embodiment, the pre-defined period l depends on number of pre-defined time instances t in the predefined time period T.

In accordance with an embodiment of the present disclosure, the one or more hardware processors 204 are configured to estimate at step 314, the usage pattern as a charging and discharging schedule of the behind-the-meter energy storage, by segregating charging periods and discharging periods. The charging periods and the discharging periods are segregated based on the median of estimated charging or discharging values $B_{chdch}(l)$ of the energy storage for the predefined time period T.

If the median for the pre-defined period l is positive, then the pre-defined period l of the energy storage is said to be discharged. Similarly, if the median for the pre-defined period l is negative, then the pre-defined period l of the energy storage is said to be charged. Accordingly, the charging periods and the discharging periods are segregated for the predefined time period T.

In accordance with an embodiment of the present disclosure, the one or more hardware processors 204 are configured to estimate, at step 316, the effective capacity $\overline{B_{eff}}$ of behind-the-meter energy storage of the target consumer, based on the estimated charging or discharging values $B_{chdch}(t)$. The effective capacity $\overline{B_{eff}}$ of behind-the-meter energy storage of the target consumer is an absolute maximum value obtained from cumulative estimated charging or discharging values $B_{chdch}(t)$.

In an embodiment, the effective capacity $\overline{B_{eff}}$ of behind-the-meter energy storage of the target consumer is estimated as maximum depth of charge or discharge ever occurred during usage of the target consumer.

In an embodiment, if $\Delta(t)$ is an estimate of the charging or the discharging occurred and if multiple charging or discharging periods occurred in the pre-defined time instances t, then $\Delta(t)$ represents an amount of charging or discharging as a net of all individual discrete charges and discharges, hence $\Delta(t) \in [-B, B]$, where $-B$ represents maximum charging value and B represents maximum discharge value. Hence the effective capacity $\overline{B_{eff}}$ of behind-the-meter energy storage of the target consumer lies between $[-B, B]$.

In an embodiment, the time series $\Delta(t)$ is considered to be an estimate of $B_{chdch}(t)$, then $\Delta(t)$ is defined as per the below equation:

$$\Delta(t) = E_{raw}(t) - (E_{raw}(t) - B_{chdch}) \quad (6)$$

where a negative value of $\Delta(t)$ represents charging status of the energy storage and a positive value of $\Delta(t)$ represents discharging status of the energy storage.

Hence, the effective capacity $\overline{B_{\mathit{eff}}}$ of behind-the-meter energy storage of the target consumer is estimated by integrating $\Delta(t)$ to obtain the cumulative estimated charging or discharging values $B_{chdch}(t)$. If integrated $\Delta(t)$ is defined as $\sigma(t)$ then, the $\sigma(t)$ is represented by:

$$\sigma(t) = \int_0^t \Delta(t) dt \qquad (7)$$

where the effective capacity of behind-the-meter energy storage of the target consumer is defined as $$\max_t(\sigma(t)).$$

Figure 4:
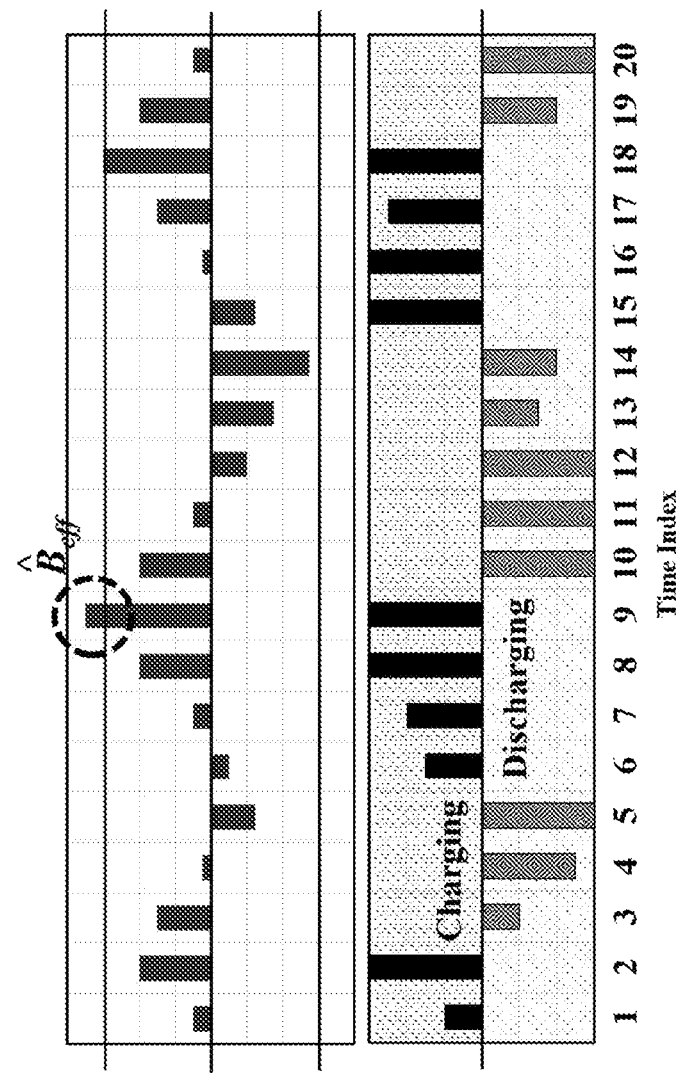
FIG. 4 is a graph showing an estimated effective capacity and usage pattern of behind-the-meter energy storage of a target consumer, in accordance with an embodiment of the present disclosure.

FIG. 4 is a graph showing the estimated effective capacity and usage pattern of behind-the-meter energy storage of a target consumer, in accordance with an embodiment of the present disclosure. The usage pattern is represented in form of a charging and discharging schedule of the behind-the-meter energy storage based on the charging periods and the discharging periods. The estimated effective capacity ($\overline{B_{\mathit{eff}}}$) of the behind-the-meter energy storage of the target consumer is shown in the graph under the maximum cumulative charging value.

Experimental Results:

The data samples are obtained from a utility which operates in a developed economy and supplies a mix of conventional and renewable energy generation units to the consumers. The utility also sells solar energy generation units and the energy storage such as batteries in standard capacities. The utility caters to a range of large-scale industries, small and medium scale businesses, and residential consumers. Because most hidden capacities of the energy storage and the solar energy generation units prevail in the household segment, residential consumers are studied in the experimental work.

The data samples of 716 residential consumers who have subscribed to either demand response programs or solar energy generation credit programs are obtained from the utility. Hence the ground truth information is known for the 716 residential consumers. The residential consumer pool comprises consumers without any solar energy generation units as well as with solar energy generation units. The data samples are obtained for the time period of 18 months, which consists of (i) hourly consumption data samples from smart meter logs (ii) hourly FIT meter data samples of the residential consumers having solar energy generation units; and (iii) energy storage logs for the consumers having the energy storage such as batteries.

Figure 5A:
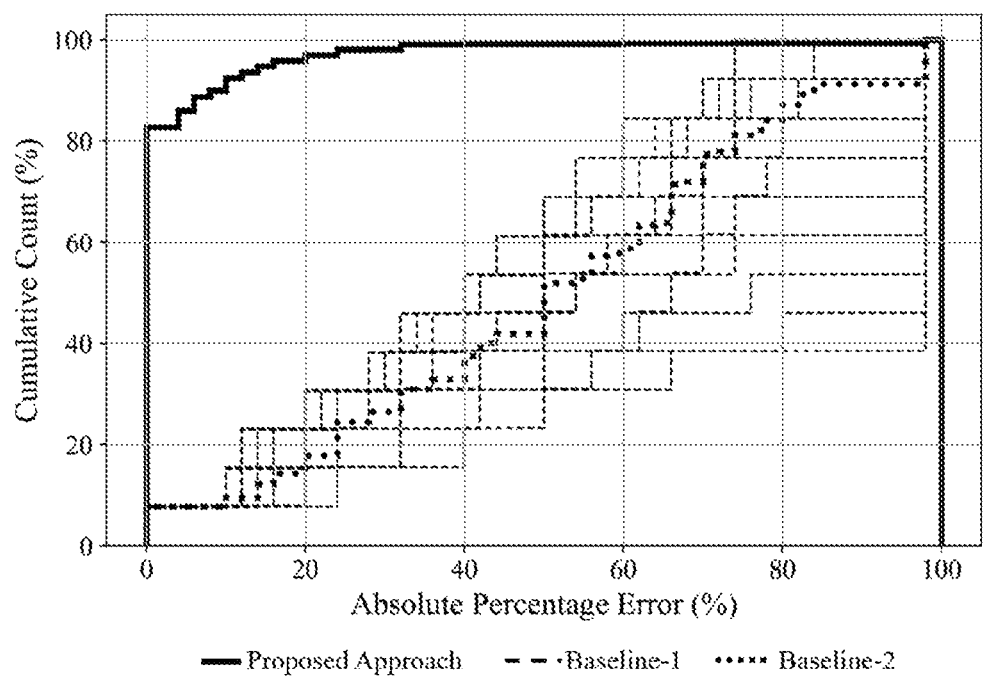
FIG. 5A is a graph showing an absolute percentage error of estimated effective capacity P of one or more distributed energy generation units of a target consumer in accordance with an embodiment of the present disclosure compared to an Off-the-shelf configuration baseline (OTS) and Configuration of a matching consumer (CMC).

FIG. 5A is a graph showing an absolute percentage error of estimated effective capacity $\hat{P}$ of one or more distributed energy generation units of a target consumer in accordance with an embodiment of the present disclosure compared to an Off-the-shelf configuration baseline (OTS) and Configuration of a matching consumer (CMC). It is observed that accuracy of the method 300 is substantial in estimating the effective capacity $\hat{P}$ of the solar energy generation units. In 85% of consumers, the method 300 has <2% error (98% accurate); and in 96% of the consumers, the error has <20%. On the other hand, in 96% of the consumers, the compared baselines: Off-the-shelf configuration baseline (OTS) and Configuration of the matching consumer (CMC) have errors between 70%-100%.

Figure 5B:
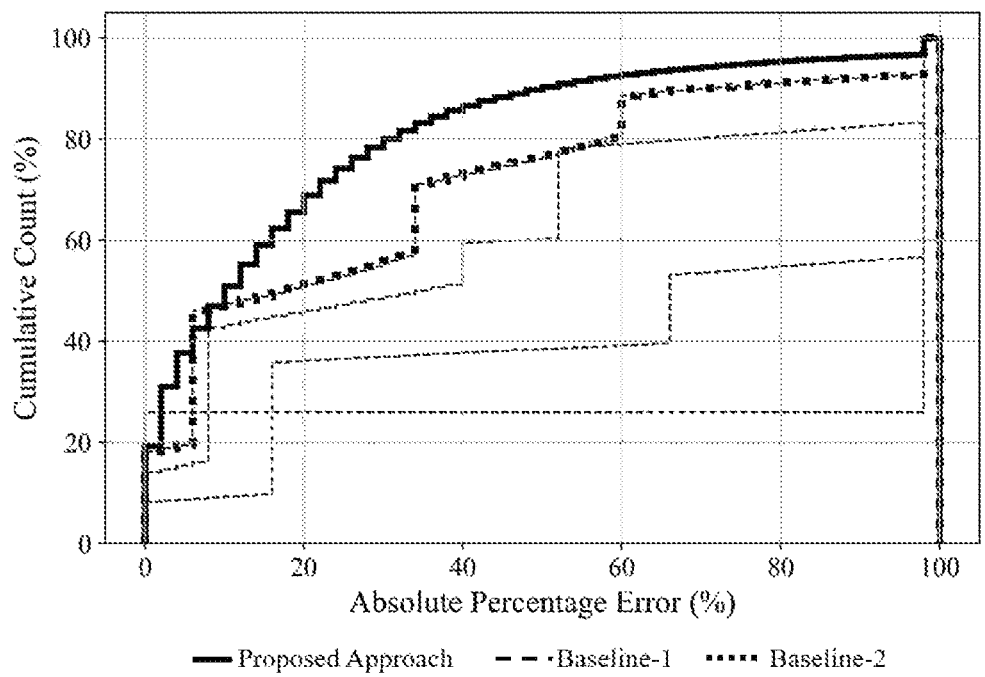
FIG. 5B is a graph showing an absolute percentage error of estimated effective capacity of behind-the-meter energy storage of a target consumer in accordance with an embodiment of the present disclosure compared to an Off-the-shelf configuration baseline (OTS) and Configuration of a matching consumer (CMC).

FIG. 5B is a graph showing an absolute percentage error of estimated effective capacity of behind-the-meter energy storage of the target consumer in accordance with an embodiment of the present disclosure compared to an Off-the-shelf configuration baseline (OTS) and Configuration of a matching consumer (CMC). It is observed that performance of the proposed method 300 in estimating the capacity of the behind-the-meter energy storage is fairly reasonable having less than 20% error for 70% of the consumers, compared to the baselines: Off-the-shelf configuration baseline (OTS) and Configuration of the matching consumer (CMC) which have errors of <35%.

Figure 6:
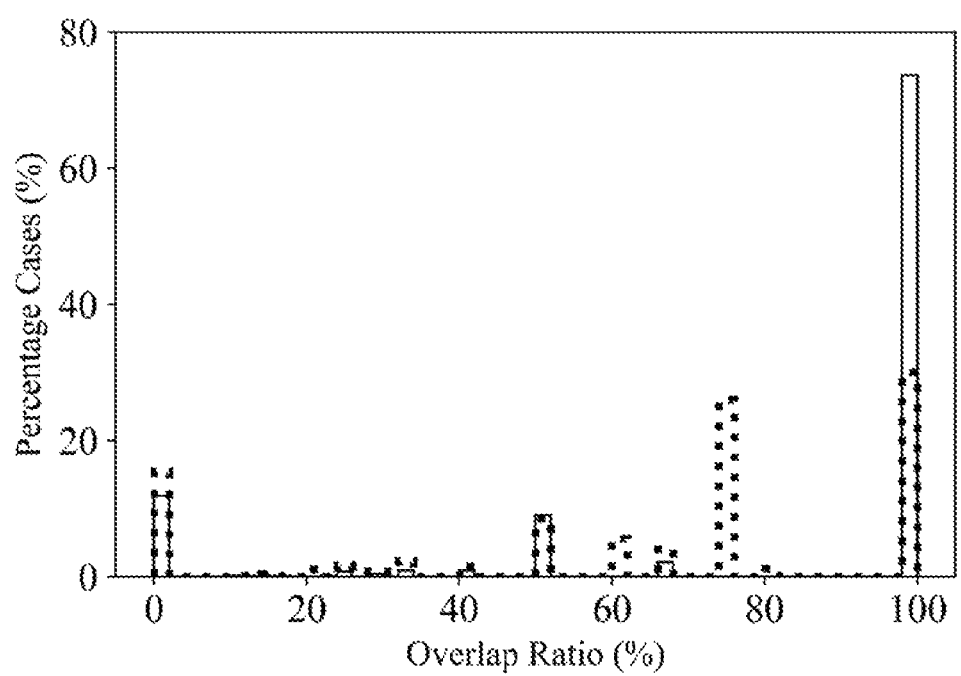
FIG. 6 is a graph showing an overlap of a charging schedule and a discharging schedule of behind-the-meter energy storage of a target consumer, in accordance with an embodiment of the present disclosure.

FIG. 6 is a graph showing an overlap of a charging schedule and a discharging schedule of behind-the-meter energy storage of a target consumer, in accordance with an embodiment of the present disclosure. It is noticed that the estimated charging hours for about 75% consumers, the method 300 perfectly matches with the actual charging schedules (100% overlap). In case of estimated charging hours, the method 300 perfectly matches for 30% of the consumers, while in 65% of the consumers, the overlap observed is >70%. It is quite possible that when a consumer charges the energy storage, often times the charging would happen continuously whereas discharge typically happens on-the-demand in smaller quantities.

In accordance with the present disclosure, the system 200 utilizes the data samples received from the utility, the energy balance equation for estimating the charging and discharging values of the energy storage and the matching algorithm for estimating the original energy demand values of the target consumer, hence it is not complex and not computationally intensive in estimating the effective capacity and usage pattern of the target consumer. The disclosed method 300 is more accurate in estimating the effective capacity and usage pattern of the target consumer as noted from the experimental results above, so that the utility may arrange proper infrastructure planning to meet power demand of the consumers.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for estimating effective capacity and usage pattern of behind-the-meter energy storage of a target consumer, the method comprising:

receiving data samples, at every pre-defined time instant t for a predefined time period T, by one or more hardware processors, from a utility, wherein the data samples contain a manifested demand $E_{man}(t)$ of the target consumer, an exported energy $E_{FIT}(t)$ by the target consumer back to the utility, and an energy source factor $S(t)$ corresponding to each of one or more distributed energy generation units;

determining yield $Y_u(t)$ of the one or more distributed energy generation units, by the one or more hardware processors, based on a corresponding energy source factor $S(t)$ of the one or more distributed energy generation units, at the every pre-defined time instant t;

determining total yield yield (t) of the one or more distributed energy generation units, by the one or more hardware processors, based on a corresponding estimated effective capacity $\hat{P}$ of the one or more distributed energy generation units of the target consumer and a corresponding yield $Y_u(t)$ of the one or more distributed energy generation units, at the every pre-defined time instant t;

estimating original energy demand values $\hat{E}_{raw}(t)$ of the target consumer, by the one or more hardware processors, based on an original energy demand $E_{raw}(t)$ of a known reference consumer, at the every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer and the reference consumer from the utility;

determining estimated charging or discharging values $\hat{B}_{chdch}(t)$ of the behind-the-meter energy storage, at the every pre-defined time instant t, by the one or more hardware processors, based on an energy balance equation, wherein the energy balance equation is represented as
$B_{chdch}(t) = \hat{E}_{raw}(t) - E_{man}(t) + E_{FIT}(t) - \text{yield}(t)$, where $B_{chdch}(t)$ represents the estimated charging or discharging values, $E_{raw}(t)$ represents the original energy demand values, $E_{man}(t)$ represents the manifested demand of the target consumer, $E_{FIT}(t)$ represents the exported energy by the target consumer back to the utility, yield (t) represents the total yield of the one or more distributed energy generation units;

computing a median of the estimated charging or discharging values $\hat{B}_{chdch}(t)$ by the one or more hardware processors, for each pre-defined period l containing one or more pre-defined time instances t, in the predefined time period T;

estimating the usage pattern as a charging and discharging schedule of the behind-the-meter energy storage, by segregating charging periods and discharging periods, based on the median of estimated charging or discharging values $\hat{B}_{chdch}(t)$ of the energy storage for the predefined time period T, by the one or more hardware processors; and estimating the effective capacity $\overline{B_{eff}}$ of behind-the-meter energy storage of the target consumer, by the one or more hardware processors, based on the estimated charging or discharging values $\hat{B}_{chdch}(t)$, wherein the effective capacity of behind-the-meter energy storage of the target consumer is an absolute maximum value obtained from cumulative estimated charging or discharging values $\hat{B}_{chdch}(t)$, the usage pattern and the effective capacity $\overline{B_{eff}}$ of behind-the-meter energy storage of the target consumer are estimated in presence of the one or more distributed energy generation units, the one or more distributed energy generation units are in an electric network for generating power, connecting an inverter to the one or more distributed energy generation units to convert the generated power from Direct Current (DC) form to Alternate Current (AC) form;

connecting the utility to the electric network of the target consumer to supply the power required by consumer facilities of the target consumer; and connecting an energy storage to the one or more distributed energy generation units through the inverter for charging the power generated by the one or more distributed energy generation units.

2. The method of claim 1, wherein the yield $Y_u(t)$ of the one or more distributed energy generation units are determined according to a relation:

$$Y_u(t) = f(S(t))$$

where f represents an energy conversion function.

3. The method of claim 1, wherein the estimated effective capacity $\hat{P}$ of each of the one or more distributed energy generation units of the target consumer is determined as a maximum value of a ratio of a corresponding exported energy $E_{FIT}(t)$ by the target consumer to the corresponding yield $Y_u(t)$ of the one or more distributed energy generation units.

4. The method of claim 3, wherein the estimated effective capacity $\hat{P}$ of each of the one or more distributed energy generation units of the target consumer is determined according to a relation:

$$\hat{P} = \max(E_{FIT}(t)/Y_u(t)).$$

5. The method of claim 1, wherein the total yield that is yield (t) of each of the one or more distributed energy generation units is determined according to a relation:

$$\text{yield}(t) = \hat{P} * Y_u(t).$$

6. A system for estimating effective capacity and usage pattern of behind-the-meter energy storage of a target consumer, the system comprising:
one or more data storage devices operatively coupled to one or more hardware processors and configured to store instructions which when executed cause the one or more hardware processors to:
receive data samples, at every pre-defined time instant t for a predefined time period T, from a utility, wherein the data samples contain a manifested demand $E_{man}(t)$ of the target consumer, an exported energy $E_{FIT}(t)$ by the target consumer back to the utility and an energy source factor $S(t)$ corresponding to each of one or more distributed energy generation units;
determine yield $Y_u(t)$ of the one or more distributed energy generation units, based on a corresponding energy source factor $S(t)$ of the one or more distributed energy generation units, at the every pre-defined time instant t;
determine total yield yield (t) of the one or more distributed energy generation units, based on a corresponding estimated effective capacity $\hat{P}$ of the one or more distributed energy generation units of the target consumer and a corresponding yield $Y_u(t)$ of the one or more distributed energy generation units, at the every pre-defined time instant t;
estimate original energy demand values $\hat{E}_{raw}(t)$ (t) of the target consumer, based on an original energy demand $E_{raw}(t)$ of a known reference consumer, at the every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer from the utility;
determine estimated charging or discharging values $\hat{B}_{chdch(t)}$ (t) of the behind-the-meter energy storage, at every pre-defined time instant t, based on an energy balance equation,
wherein the energy balance equation is represented as $B_{chdch}(t) = \hat{E}_{raw}(t) - E_{man}(t) + E_{FIT}(t) - \text{yield}(t)$, where $B_{chdch}(t)$ represents the estimated charging or discharging values, $E_{raw}(t)$ represents the original energy demand values, $E_{man}(t)$ represents the manifested demand of the target consumer, $E_{FIT}(t)$ represents the exported energy by the target consumer back to the utility, yield (t) represents the total yield of the one or more distributed energy generation units;
compute a median of the estimated charging or discharging values $\hat{B}_{chdch(t)}$ (l)) for each, pre-defined period l containing one or more pre-defined time instances t, in the predefined time period T;
estimate the usage pattern as a charging and discharging schedule of the behind-the-meter energy storage, by segregating charging periods and discharging periods, based on the median of estimated charging or discharging values $\hat{B}_{chdch(t)}$ (l) of the energy storage for the predefined time period T; and
estimate the effective capacity $\overline{B_{eff}}$ of behind-the-meter energy storage of the target consumer, based on the estimated charging or discharging values $\hat{B}_{chdch(t)}$ (t), wherein
the effective capacity $\overline{B_{eff}}$ of behind-the-meter energy storage of the target consumer is an absolute maximum value obtained from cumulative estimated charging or discharging values $\hat{B}_{chdch(t)}$ (t),
the usage pattern and the effective capacity $\overline{B_{eff}}$ of behind-the-meter energy storage of the target consumer are estimated in presence of the one or more distributed energy generation units, the one or more distributed energy generation units are in an electric network for generating power, and
connect an inverter to the one or more distributed energy generation units to convert the generated power from Direct Current (DC) form to Alternate Current (AC) form,
connect the utility to the electric network of the target consumer to supply the power required by consumer facilities of the target consumer, and
connect an energy storage to the one or more distributed energy generation units through the inverter for charging the power generated by the one or more distributed energy generation units.

7. The system of claim 6, wherein the one or more hardware processors are configured to determine the yield $Y_u(t)$ of the one or more distributed energy generation units according to a relation:

$$Y_u(t) = f(S(t)).$$

where f represents an energy conversion function.

8. The system of claim 6, wherein the one or more hardware processors are configured to determine the estimated effective capacity $\hat{P}$ of each of the one or more distributed energy generation units of the target consumer as a maximum value of a ratio of a corresponding exported energy $E_{FIT}(t)$ by the target consumer to the corresponding yield $Y_u(t)$ of the one or more distributed energy generation units.

9. The system of claim 8, wherein the one or more hardware processors are configured to determine the estimated effective capacity $\hat{P}$ of each of the one or more distributed energy generation units of the target consumer according to a relation:

$$\hat{P} = \max(E_{FIT}(t)/Y_u(t)).$$

10. The system of claim 6, wherein the one or more hardware processors are configured to determine the total yield that is yield (t) of each of the one or more distributed energy generation units according to a relation:

$$\text{yield}(t) = \hat{P} * Y_u(t).$$

11. A computer program product comprising a non-transitory computer readable medium having a computer readable program embodied therein, wherein the computer readable program, when executed on a computing device, causes the computing device to:
   receive data samples, at every pre-defined time instant t for a predefined time period T, from a utility, wherein the data samples contain a manifested demand $E_{man}(t)$ of the target consumer, an exported energy $E_{FIT}(t)$ by the target consumer back to the utility and an energy source factor S(t) corresponding to each of one or more distributed energy generation units;
   determine yield $Y_u(t)$ of the one or more distributed energy generation units, based on a corresponding energy source factor S(t) of the one or more distributed energy generation units, at the every pre-defined time instant t;
   determine total yield yield (t) of the one or more distributed energy generation units, based on a corresponding estimated effective capacity $\hat{P}$ of the one or more distributed energy generation units of the target consumer and a corresponding yield $Y_u(t)$ of the one or more distributed energy generation units, at the every pre-defined time instant t;
   estimate original energy demand values $\hat{E}_{raw(t)}$ (t) of the target consumer, based on an original energy demand $E_{raw}(t)$ of a known reference consumer, at every pre-defined time instant t, by mapping the manifested demand $E_{man}(t)$ consumption pattern of the target consumer with those of the known reference consumer, identified using a matching algorithm, wherein the consumption pattern corresponds to energy consumed by the target consumer from the utility;
   determine estimated charging or discharging values $\hat{B}_{chdch(t)}$ (t) of the behind-the-meter energy storage, at the every pre-defined time instant t, based on an energy balance equation,
      wherein the energy balance equation is represented as $B_{chdch}(t) = \hat{E}_{raw(t)}(t) - E_{man}(t) + E_{FIT}(t) - \text{yield}(t)$,
      where $B_{chdch}(t)$ represents the estimated charging or discharging values, $E_{raw}(t)$ represents the original energy demand values, $E_{man}(t)$ represents the manifested demand of the target consumer, $E_{FIT}(t)$ represents the exported energy by the target consumer back to the utility, yield (t) represents the total yield of the one or more distributed energy generation units;
   compute a median of the estimated charging or discharging values $\hat{B}_{chdch(t)}$ (l) for each pre-defined period l containing one or more pre-defined time instances t, in the predefined time period T;
   estimate the usage pattern as a charging and discharging schedule of the behind-the-meter energy storage, by segregating charging periods and discharging periods, based on the median of estimated charging or discharging values $\hat{B}_{chdch(t)}$ (l) of the energy storage for the pre-defined time period T; and
   estimate the effective capacity $\widehat{B_{eff}}$ of behind-the-meter energy storage of the target consumer, based on the estimated charging or discharging values $\hat{B}_{chdch(t)}$ (t), wherein
      the effective capacity $\widehat{B_{eff}}$ of behind-the-meter energy storage of the target consumer is an absolute maximum value obtained from cumulative estimated charging or discharging values $\hat{B}_{chdch(t)}$ (t),
      the usage pattern and the effective capacity $\widehat{B_{eff}}$ of behind-the-meter energy storage of the target consumer are estimated in presence of the one or more distributed energy generation units,
      the one or more distributed energy generation units are in an electric network for generating power,
      the one or more distributed energy generation units are in an electric network for generating power,
      connecting an inverter to the one or more distributed energy generation units to convert the generated power from Direct Current (DC) form to Alternate Current (AC) form;
      connecting the utility to the electric network of the target consumer to supply the power required by consumer facilities of the target consumer; and
      connecting an energy storage to the one or more distributed energy generation units through the inverter for charging the power generated by the one or more distributed energy generation units.

* * * * *